July 15, 1930.   C. F. IRISH   1,770,407
TREE EXCAVATING AND REMOVING APPARATUS
Filed Aug. 20, 1927   2 Sheets-Sheet 1
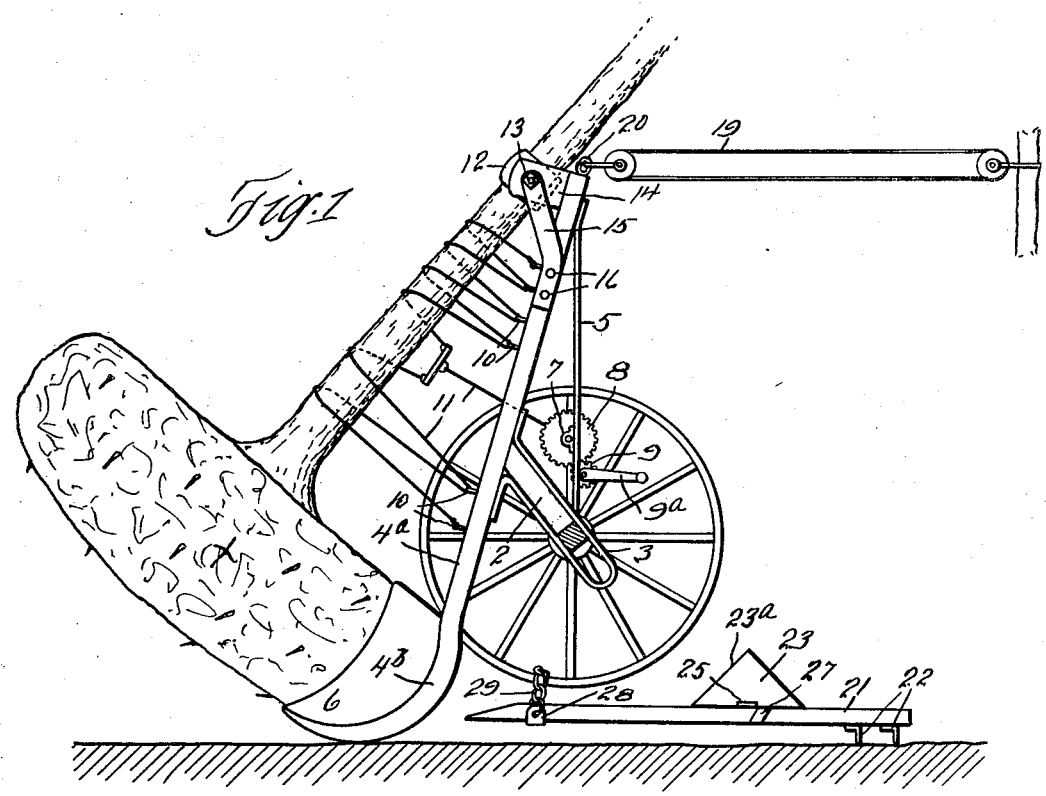
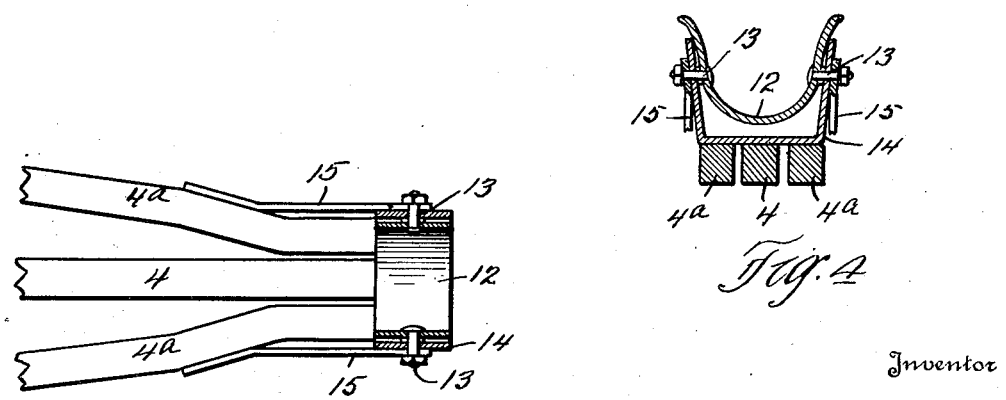
Inventor
Charles F. Irish
By Hull, Brock & West
Attorneys July 15, 1930.    C. F. IRISH    1,770,407
TREE EXCAVATING AND REMOVING APPARATUS
Filed Aug. 20, 1927    2 Sheets-Sheet 2
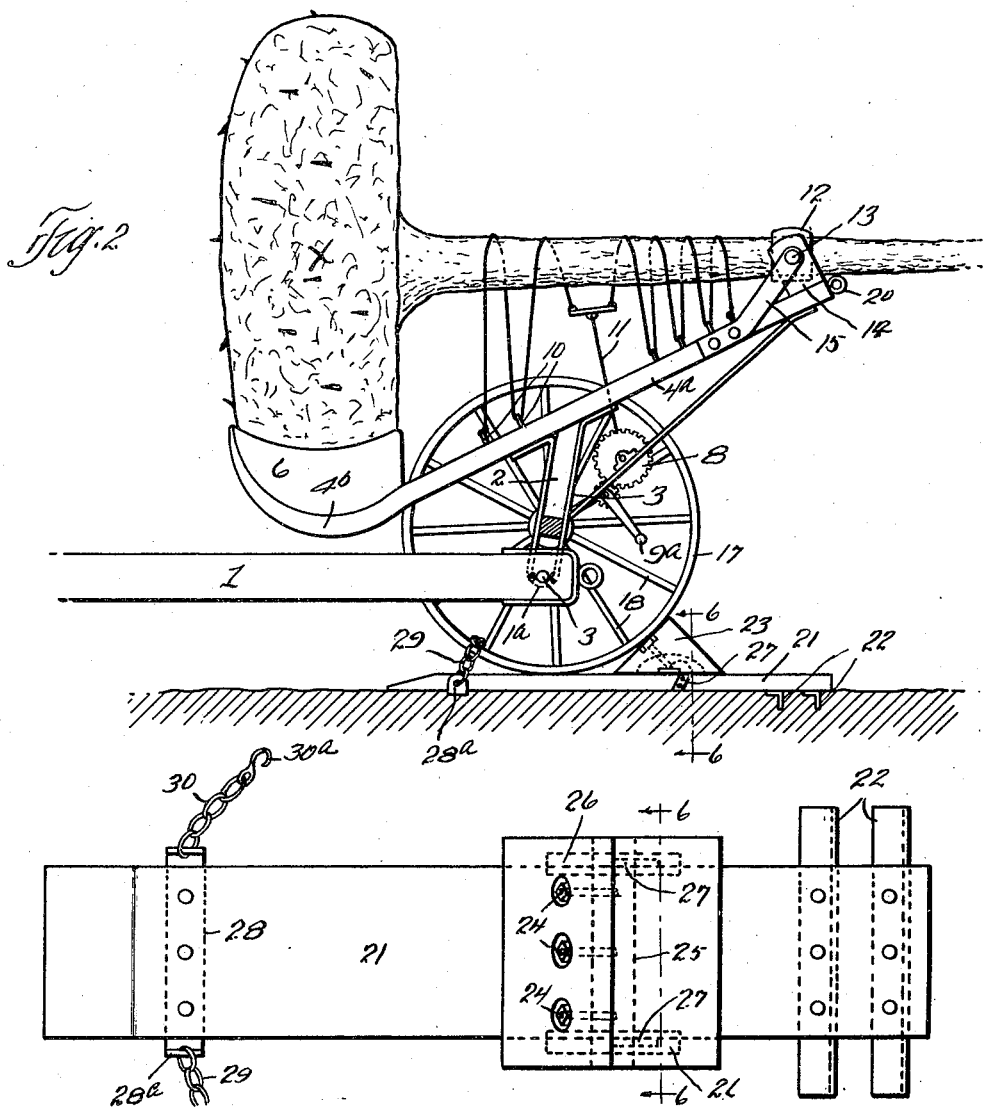
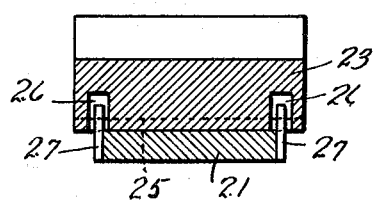
Inventor
Charles F. Irish
By Hull, Brock & West
Attorneys Patented July 15, 1930

1,770,407

UNITED STATES PATENT OFFICE

CHARLES F. IRISH, OF BRATENAHL, OHIO

TREE EXCAVATING AND REMOVING APPARATUS

Application filed August 20, 1927. Serial No. 214,416.

This invention relates to apparatus for excavating and removing trees and has for its general object to provide apparatus of the kind with a combined removing and transporting cradle having means by which the trunk of the tree may be supported in an efficient manner while being transported.

A further object of the invention is to provide, for apparatus of this character, an improved means for blocking the wheels which carry the cradle, during the operation of removing the tree.

I accomplish the foregoing objects by the constructions shown in the drawings, wherein Fig. 1 represents a side view, partly in section, of the rear truck carrying the excavating and transporting cradle, showing the manner in which the blocking means is applied to the wheels as well as the manner of supporting the trunk, the parts being shown in the positions which they assume prior to coupling the rear truck to the reach; Fig. 2 a view, similar to Fig. 1, showing the cradle swung to position for connecting the reach to the rear truck; Fig. 3 is a detail in sectional plan of the saddle and the parts of the cradle associated therewith; Fig. 4 a detail in transverse section through the saddle and the aforesaid parts; Fig. 5 a plan view of one of the blocking devices; and Fig. 6 a detail in cross section of one of the said devices, the said view being taken substantially along the lines 6—6 of Figs. 2 and 5.

Describing the parts by reference characters, the tree carrier or transporter comprises as a whole a front truck (not shown) and a reach, indicated generally at 1 and having its rear end detachably connected to the bolster 2, which bolster is provided with a U-shaped metal strap 3, the lower end of which projects into a recess 1ª provided therefor in the reach, where it is detachably secured in place by a pin 3.

4 denotes the central beam and 4ª beams arranged on each side thereof and constituting the framework of the cradle, the cradle being provided with the bolster 2 and the strap 3. Braces 5 connect the rear ends of the cradle beams to the axle.

The front portions of the beams 4, 4ª diverge, and are curved at their extreme front ends, as indicated at 4ᵇ, the front ends carrying the root-excavating and supporting scoop 6, the scoop 6 being concave, thereby to conform to the root mass.

The braces 5 support the shaft 7 of a winch having at one end a gear 8 whereby the winch may be turned by means of a pinion 9 and a handle 9ª.

The central beam 4 of the cradle is provided with hooks 10 for the lashing 11, which lashing extends to the winch.

At its rear end, the cradle (comprising the parts 2—4ª) is provided with a saddle 12, which saddle is concaved downwardly to receive the trunk of the tree and is pivoted by suitable pivot pins 13 to the sides of a channeled support 14 which is secured to the cradle beams 4, 4ª. Angle braces 15 are secured at their rear upper ends to the channeled support 14 by the bolts 13, their rear and lower ends extending along the beams 4ª and being fastened thereto, as by bolts 16.

As is well known to those acquainted with this art, when it is desired to excavate and transport a tree, the reach is first uncoupled from the bolster 2. The rear truck is then run up to the tree and the scoop 6 applied to one side of the root mass X; the tree trunk is clamped to the cradle by means of the slings, with a part of the trunk resting in the saddle 12, after which the cradle, with the tree secured thereto, is tilted upwardly by means of tackle 19 connected to the eye bolt 20 at the rear end of the cradle. When the tree cradle shall have been moved to approximately the position shown in Fig. 2, the rear truck, with the tree in place, is moved or drawn to the appropriate place and the front truck is then connected. This is done by releasing the strain on the tackle 19 until the tree assumes a nearly upright position, the cradle and root mass resting on the ground. This carries the rear truck upwardly so that the rear wheels are lifted from the ground, as shown in Fig. 1. When the wheels are in this position, the blocking devices shown and described herein are introduced thereunder.

Each such device consists of a base, consisting of a heavy plank 21 having attached to the underside and near one end thereof a pair of angle bars 22. Secured to the base 21 is the block 23, the said block being shown as triangular in cross section and anchored to the plank by means of bolts 24 extending from the front face 23ª thereof to and anchored in a strap 25 which is countersunk into the bottom of the block and secured thereto. The block is also provided with recesses 26 projecting upwardly thereinto from the bottom thereof, which recesses are adapted to receive the upper ends of hooks 27 fastened to the sides of the plank 21, the upper ends of these hooks engaging the strap 25.

Adjacent its front end, the base plank 21 is provided with a strap 28 secured to and beneath the plank and having upwardly extending flanges 28ª at the ends thereof. These flanges are provided with chains 29, 30, one of which has a hook 30ª.

With the tree elevated by the tackle 20, as shown in Fig. 1, the blocking devices are inserted below the elevated wheels, after which the tackle 19 is set up until the wheels are brought down upon the planks, after which they are chained to the planks, whereupon the strain on the tackle 19 is increased until the cradle, pivoting on the rear axle, swings the root mass sufficiently high to permit the reach 1 to be coupled to the bolster. Thereafter, the strain on the tackle is released, which causes the vehicle to run forward slightly, whereupon the blocks 23 can be detached from the planks and the chains 29, 30 removed from the wheels, and the loaded tree mover may then be run off the planks. The downwardly projecting parts of the angle bars 22 serve as cleats to enter the ground and prevent the blocking devices from moving rearwardly. After the tree mover has been moved off the blocking devices the tree can be transported thereby, the pivoting of the saddle 12 enabling it to engage the trunks of trees throughout the length of the saddle.

Having thus described my invention, what I claim is:—

1. In a tree mover, the combination, with a pair of wheels and an axle, of a cradle mounted on the axle, the said cradle having adjacent one end a portion adapted to engage and support the root mass of a tree and having adjacent its opposite end a channel, an upwardly concave saddle horizontally pivoted in said channel, and means for securing the trunk of a tree to said cradle with a portion of the trunk resting on said saddle.

2. In a tree mover, the combination, with a pair of wheels and an axle, of a cradle mounted on the axle, the said cradle having adjacent one end a portion adapted to engage and support the base portion of a tree and having adjacent its opposite end a pair of upright supports, an upwardly concave saddle horizontally pivoted to said supports, means for securing the trunk of the tree to said cradle with a portion of the trunk resting in said saddle, and braces extending between the said supports and the cradle.

3. In a tree mover, the combination, with a pair of wheels and an axle, of a cradle mounted on the axle, the said cradle comprising a support for the base portion of a tree, a pair of upright supports carried by the end of said cradle opposite said support, braces extending from the upright supports to the cradle and connected to the latter, a saddle for the trunk of a tree, the said saddle being located between the said upright supports, common means for pivotally supporting the saddle from the upright supports and for securing the adjacent ends of the braces thereto, and means for securing the trunk of the tree to the said cradle.

4. In a tree mover, the combination, with a pair of wheels and an axle, of a cradle mounted on the axle, the said cradle comprising a support for the base portion of a tree, a channel member carried by the end of said cradle opposite said support, braces extending from the sides of the channel member to the cradle and connected thereto, a saddle for the trunk of a tree, the said saddle being located within the said channel, common means for pivotally supporting the saddle within the channel and for securing the adjacent ends of the braces to said channel and means for securing the trunk of the tree to the said cradle.

5. In a tree mover, the combination, with a pair of wheels and an axle, of a cradle mounted on the axle and comprising a central beam and a beam on each side of such central beam, a support for the base portion of a tree carried by proximate ends of the said beams, a saddle for the trunk of the tree, means pivotally supporting the saddle from the opposite ends of said beams, hooks on the middle one of the said beams, and a lashing adapted to engage said hooks for securing a tree trunk to the said cradle.

6. In a tree mover, the combination, with a pair of wheels and an axle, of a cradle mounted on the axle and comprising a support for the base portion of a tree, a saddle for the trunk of the tree which is pivotally supported from the end of said cradle which is opposite said support, a winch on said cradle, hooks on said cradle, a lashing adapted to engage said hooks for securing a tree trunk to the said cradle, said lashing being operated by said winch.

In testimony whereof, I hereunto affix my signature.

CHARLES F. IRISH.